United States Patent [19]

Belmonte et al.

[11] 4,159,793

[45] Jul. 3, 1979

[54] HAND-HELD TOOL FOR OPTICAL FIBER WAVEGUIDE END PREPARATION

[75] Inventors: Carl Belmonte, Somerville; Mark L. Dakss, Sudbury; John E. Fulenwider, Concord, all of Mass.

[73] Assignee: GTE Laboratories Incorporated, Stamford, Conn.

[21] Appl. No.: 878,217

[22] Filed: Feb. 16, 1978

Related U.S. Application Data

[63] Continuation-in-part of Ser. No. 778,885, Mar. 18, 1977, Pat. No. 4,074,840.

[51] Int. Cl.$^2$ ............................................. B26F 3/00
[52] U.S. Cl. .................................. 225/96.5; 225/101; 225/105
[58] Field of Search ............... 225/96.5, 101, 103–105, 225/2

[56] References Cited

U.S. PATENT DOCUMENTS

| | | | |
|---|---|---|---|
| 3,934,773 | 1/1976 | Chinnock | 225/96.5 X |
| 4,017,013 | 4/1977 | Hawk | 225/96.5 |
| 4,036,419 | 7/1977 | Hensel | 225/96.5 |
| 4,074,840 | 2/1978 | Belmonte et al. | 225/96.5 |

OTHER PUBLICATIONS

Murata, H. et al.; *Procedures of the Fiber Communications Conference*; London; Sep. 1975; p. 93.
Itensel, P., *Simplified Optical–Fibre Breaking Machine*; In Electronics Letters; Nov. 27, 1975; p. 581.
Khoe, G. D. et al.; *Cutting Optical Fibres with a Hot Wire*; In Electronics Letters; Mar. 3, 1975; p. 147.
Hensel, P.; *Spark–Induced Fracture of Optical Fibres*; In Electronics Letters; Sep. 29, 1977; p. 603.

*Primary Examiner*—J. M. Meister
*Attorney, Agent, or Firm*—David M. Keay

[57] ABSTRACT

A tool for preparing the ends of optical fiber waveguides prior to such operations as coupling and splicing. The tool is adapted for single-handed operation and comprises a pair of manually actuated handles, first and second fiber supporting surfaces, and a third fiber supporting surface between the first and second surfaces. The optical fiber waveguide is secured to the first and second surfaces by a pair of clamping members which are responsive to the squeezing of the handles. Once the fiber waveguide is secured to the surfaces, further squeezing of the handles produces separating rotation of a pair of jaw members to put the fiber under tensile stress. A cutting blade suspended above the third surface is released to produce a peripheral microcrack on a portion of the optical fiber waveguide lying on the third fiber supporting surface. The induced stress and curved support of the fiber waveguide act in combination to propagate the microcrack diametrically through the fiber so that an appropriate fiber end is obtained. Various modifications and refinements of the tool provide for greater control and semi-automatic operation in preparing fiber ends.

16 Claims, 15 Drawing Figures

HAND-HELD TOOL FOR OPTICAL FIBER WAVEGUIDE END PREPARATION

CROSS-REFERENCE TO RELATED APPLICATIONS

This application is a continuation-in-part of application Ser. No. 778,885 filed Mar. 18, 1977, now U.S. Pat. No. 4,074,840 issued Feb. 21, 1978.

BACKGROUND OF THE INVENTION

This invention relates to tools and, more particularly, to a hand-held tool for preparing the ends of optical fiber waveguides.

A major impediment to the development of optical communications is the implementation of low-loss splicing and coupling techniques. These techniques require properly prepared fiber ends, meaning that the ends must be smooth, flat, and perpendicular to the fiber axis if high coupling efficiencies are to be obtained. An effective technique for fiber end preparation has been the score-and-break technique, originally designed for use in the laboratory. This technique involves the stretching of the fiber over a curved surface and a light scoring by a hard, sharp edge such as a diamond to produce a microcrack which is diametrically propagated through the fiber to produce a clean break. The curved surface insures a proper break for fibers having a diameter greater than a critical diameter, which for fused quartz is 110 $\mu$m, by providing a stress gradient in the stretched fiber. It is not necessary to provide a curved surface, however, if the fiber waveguide has a diameter which is less than this critical value.

It may be appreciated that fiber end preparation is likely to occur under field conditions, and it is therefore desirable to provide a fiber preparation tool which is highly portable and simple to operate. Preferably the tool should be similar to one familiar to service personnel.

One tool which has been developed for carrying out the score-and-break technique in the field is described in an article entitled "Splicing of Optical Fiber Cable on Site" by H. Murata et al. (Procedures of the Fiber Communication Conference; London; September 1975; p. 93.) By means of the tool the fiber is bent at a given radius and held in a tension-applied condition while it is scored and broken. The tool includes a curved fiber-supporting surface, a pair of clamps which secure the fiber to the surface, means for including tension in the fiber, and a wedge-like diamond blade that scores the fiber. The clamps and blade are actuated by a plurality of manually adjustable rod-shaped members which are coupled to an A-shaped mechanism, the legs of which are a pair of manually actuated arms and the lateral element of which is a centrally hinged linkage member. As the arms are squeezed together, the rods are pulled downward by the folding linkage, clamping the fiber to the curved surface and lowering the blade for scoring action on the fiber. The tool construction is complicated. The rod activators must be manually adjusted to achieve both the proper clamping force and blade penetration for various fiber diameters. The difficult construction of this complicated tool is reflected in its high cost.

Another fiber preparation tool for use under controlled conditions is disclosed in an article entitled "Simplified Optical Fibre Breaking Machine" by P. Hensel (Electronics Letters, Vol. 11, No. 24, p. 581 [27 Nov. 1975]). With this tool, a fiber having one end secured to a fixture is secured at its other end to the periphery of a rotatable segmented drum and is tensioned by the rotation of the drum. A cutting blade, working against a dashpot, scores and breaks the tensioned fiber. As stated in the article, the tool is for use under controlled conditions. The tool is larger than a hand tool and comparatively unwieldy.

SUMMARY OF THE INVENTION

It is an object, therefore, of the present invention to provide a hand-held fiber end preparation tool which is relatively simple in construction.

It is another object of the present invention to provide a fiber end preparation tool which is similar in operation to other tools heretofore used by service personnel on, for example, electrical wire telecommunication systems.

A hand-held tool for the preparation of optical fiber waveguide ends in accordance with the present invention comprises a pair of jaw members coupled for separating rotational movement about a pivot axis and means of biasing the jaw members in a comparatively unseparated position. First and second fiber supporting surfaces, respectively, are located on different ones of the jaw members for receiving and supporting an optical fiber waveguide generally circumferentially about the pivot axis. A third fiber supporting surface is positioned between the first and second fiber supporting surfaces and is generally aligned therewith. The tool includes a pair of spaced-apart handle members which are adapted for movement by a squeezing human hand. Fiber clamping means are responsive to movement of the handle members to exert a waveguide securing force against the first and second fiber supporting surfaces and to exert a jaw member separating force in response to further movement of the handle members, thereby inducing a tensile stress along the waveguide. A descendable cutting blade is releasable from a position above the third fiber supporting surface to contact the portion of the fiber waveguide thereon and produce a microcrack in the waveguide periphery whereby the induced tensile stress in the waveguide coupled with the circumferential support thereof causes a diametric propagation of the crack across the waveguide to produce an appropriately prepared cleaved fiber end.

The tool in accordance with the present invention may incorporate various modifications and refinements. For example, a stop means may be provided for limiting the movement of the cutting blade so as to prevent the cutting blade from contacting the third fiber supporting surface. The tool may incorporate a force adjusting means for adjusting the waveguide securing force exerted on the fiber waveguide. Jaw restraining means may be employed in order to maintain the jaw members in the separated position, and means may be incorporated for causing the cutting blade to be released automatically when the jaw members have been separated by a predetermined amount, and also for restoring the cutting blade to its initial position.

For a better understanding of the present invention, together with other and further objects, advantages, and capabilities thereof, reference is made to the following disclosure and appended claims in connection with the above-described drawings.

DETAILED DESCRIPTION OF THE INVENTION

Figure 1:
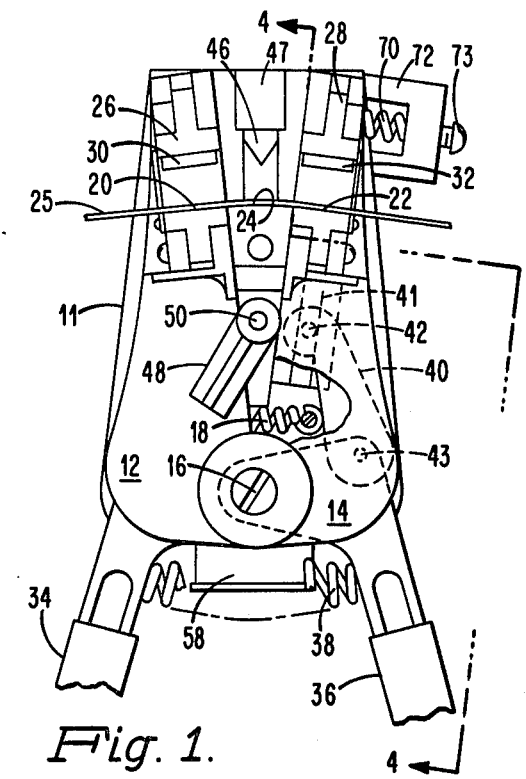
FIG. 1 illustrates a hand-held fiber end preparation tool in accordance with the present invention.
Figure 4:
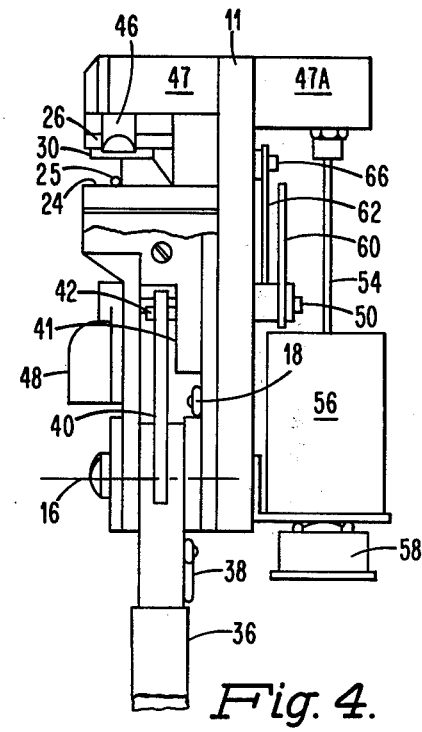
FIG. 4 is a side view of the tool as shown in FIG. 1 partially in section taken along the line 4—4 of FIG. 1.
Figure 5:
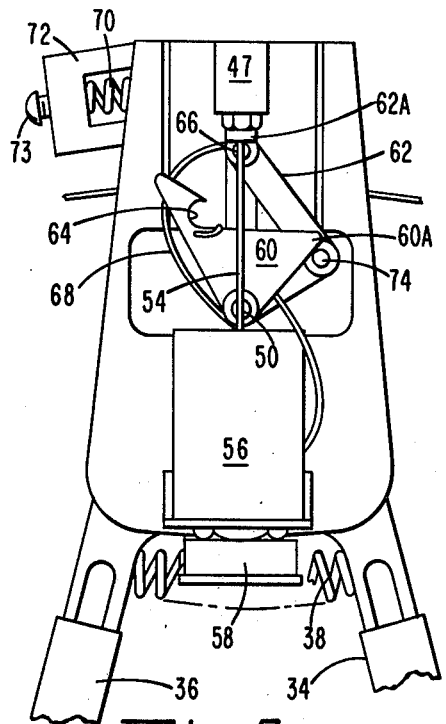
FIG. 5 is a rear view of the tool as shown in FIG. 1 prior to the lowering of the cutting blade onto the fiber waveguide.

Referring initially to FIGS. 1, 4, and 5, the front, side, and rear views, respectively, of a fiber end preparation tool in accordance with the invention are shown. As shown in FIG. 1, the tool comprises a pair of jaw members 12 and 14 coupled for separating rotation about a pivot axis 16 which is normal to the plane of the drawing. In the embodiment illustrated the jaw member 12 is affixed to a backplate 11 while the jaw member 14 is coupled for rotation with respect thereto by a bolt at the pivot axis.

The jaw members 12 and 14 are biased toward each other in a comparatively unseparated position primarily by a tension spring 18 coupled therebetween. Other springs also urge the jaw member toward each other as will be described hereinbelow. The term "comparatively unseparated" is employed to connote that the jaw members need not necessarily be contiguous in their unseparated position but may simply be spaced from each other by a lesser distance than that subsequent to the separating rotational movement of jaw member 14 as will be described hereinbelow.

Respectively associated with the jaw members 12 and 14 are a pair of members providing fiber supporting surfaces 20 and 22 which receive and support an optical fiber waveguide 25 in a generally circumferential manner about the pivot axis 16. An anvil or platform provides a third fiber supporting surface 24 which is circumferentially disposed about the axis 16 and lies between the first and second surfaces 20 and 22 with its ends tangentially aligned therewith. The anvil providing the fiber supporting surface 24 is fixed with respect to the backplate 11 and the stationary jaw member 12. The surfaces 20, 22, and 24 have machined finishes which are essentially free of nicks which might damage a fiber. Surface 24 has a low coefficient of friction and may conveniently comprise a metal which is spray-coated with teflon to provide the low friction coefficient.

Figure 2:
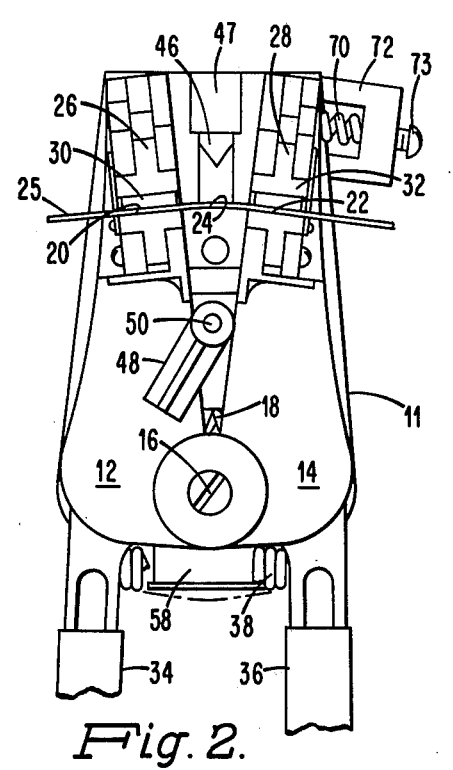
FIG. 2 shows the tool of FIG. 1 in its fiber clamping position.

The tool is held by a pair of spaced-apart handle members 34 and 36 which are adapted for rotational movement about the pivot axis 16 in response to a squeezing force exerted by the operator's hand. The handle members are biased apart by a compression spring 38. The handle members 34 and 36 are coupled to a respective one of a pair of fiber clamping members 26 and 28 by way of a pair of linkage members. As shown in FIGS. 1 and 4, handle member 36 is coupled to one end of the linkage member 40 by a pin 43 and the other end of the linkage member is coupled to the fiber clamping member 28 by a pin 42. The clamping member 28 is mounted for confined movement in a track 41 so that the squeezing of the arm 36 is translated into a movement by the fiber clamping member 28 towards the fiber supporting surface 22. The handle member 34 is similarly coupled to the fiber clamping member 26 which is mounted for movement in a similar track. Accordingly, it may be appreciated that compression of the handle members 34 and 36 by a squeezing human hand, as shown in FIG. 2, causes the optical fiber waveguide 25 to be securely held against the fiber supporting surfaces. The teflon coating on the fiber supporting surface 24 also serves to cushion the fiber as it is bent.

Figure 3:
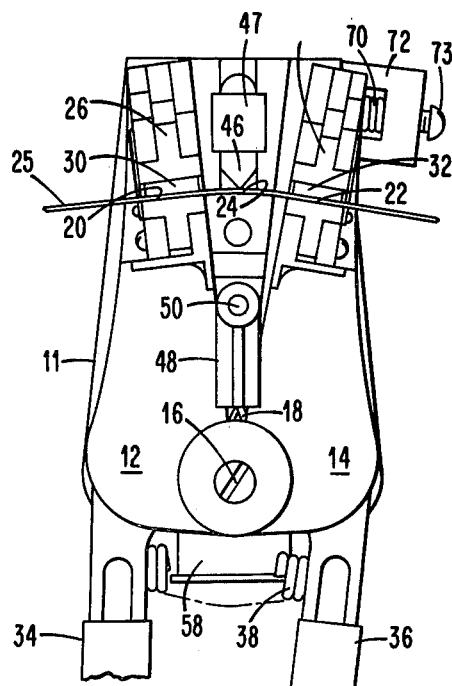
FIG. 3 illustrates the tool of FIGS. 1 and 2 in its fiber tensioning position with the blade alighting on the fiber waveguide.

As shown in an exaggerated manner, for clarity, in FIG. 3, further squeezing of the handle members 34 and 36 causes separating rotation of the jaw members 12 and 14 inducing tensile stress in the waveguide 25. The jaw separation is caused by a clockwise torque on the jaw member 14 about the axis 16 which is, in turn, produced by the lateral force of the pin 42 against the track 41. Analytically, the additional squeezing force may be conveniently resolved, with respect to the axis 16, into a generally radial component exerting the fiber securing force and a circumferential component exerting the clockwise torque. The counter-torque produced by the tensioned spring 18, which initially maintains the jaw members in their comparatively unseparated relationship, is overcome by the circumferential component when the fiber clamping members 26 and 28 securely clamp the waveguide 25 and additional manual squeezing force is applied to the handle members 34 and 36.

The counter-torque required to be overcome by the circumferential component may be made adjustable in order to adjust the amount of fiber clamping force exerted on the fiber waveguide by the fiber clamping members 26 and 28. A compression spring 70 may be mounted within a yoke 72 which is fixed to the backplate 11. The spring is compressed between the yoke 72 and the jaw member 14. The amount of force in the compression spring may be adjusted by means of an adjusting screw 73. With this arrangement the tension spring 18 and the compression spring 70 operate together to determine the amount of clamping force which must be applied by the squeezing of the handle members 34 and 36 before the jaw members 12 and 14 begin to separate.

The fiber clamping members 26 and 28 each include a member 30 and 32, respectively, providing fiber contacting surfaces which preferably are of rubber. The clamping force and the resulting net tension induced on the fiber are related in a complex way to the friction coefficients of the fiber, the rubber, and the fiber supporting surfaces. Continuous squeezing of the handle members 34 and 36 increases the tension on the fiber between the two gripped regions. Since the fiber is not elastic, the friction coefficients are selected to allow a degree of slippage and consequently limit the induced stress level in the fiber. It has been found that carbon filled butyl rubber provides a satisfactory friction coefficient.

Once the fiber waveguide 25 has been stressed, a descendable cutting blade 46 is released from an initial suspended position above the fiber supporting surface 24, as shown in FIG. 2, to a fiber contacting position as shown in FIG. 3. The blade contacts the periphery of the optical fiber waveguide 25 to produce a microcrack therein. The induced tensile stress in the waveguide 25 coupled with the circumferential curve thereof causes a diametric propagation of the crack across the waveguide to cleave the waveguide and produce an appropriately prepared fiber end. The blade 46 is preferably a diamond honed to a sharp 60° edge, and mounted in a supporting block 47. Other blade materials such as sapphire or tungsten carbide may also be used. As will be discussed in more detail hereinbelow, the supporting block 47 is mounted in a slide which allows motion along an axis perpendicular to the plane that is tangent to the fiber at the point of contact of the diamond edge thereon. As will also be further discussed hereinbelow, in the embodiment under discussion the supporting blade 47 with the blade 46 is held in its suspended position by a thumb release latch 48 which is positioned on the tool in alignment with the natural position of an operator's thumb when the handles are being squeezed. Rotation of the thumb latch 48 from its position in FIG. 2 to its position in FIG. 3 permits the blade to fall under the influence of gravity. Preferably, however, the blade speed is slowed by means such as an air-pot (air-filled dashpot) to an adjusted constant velocity so that the blade just alights on the optical fiber waveguide.

Figure 6:
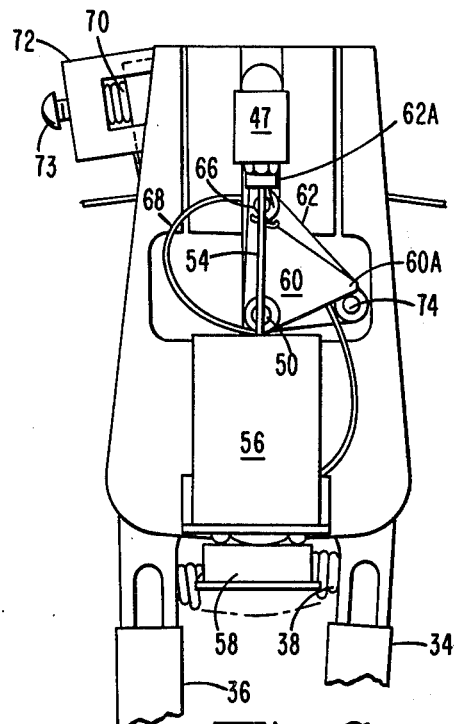
FIG. 6 is a rear view of the tool as shown in FIG. 3 subsequent to the lowering of the cutting blade onto the fiber waveguide.

The manner in which the blade 46 is controlled may be more readily appreciated by reference to FIGS. 4 and 6. As shown in FIG. 4 which is a side view of the tool taken in partial section along the line 4—4 of FIG. 1, the blade 46 is suspended from a supporting member 47 which is mounted for vertical sliding motion in a vertical slot formed in the backplate 11. The rear portion 47A of the supporting member 47 is coupled to an arm 54 of a dashpot 56. The thumb latch 48 is connected by means of a pin 50 to a cam 60, shown in FIGS. 5 and 6, on the rear of the tool.

FIGS. 5 and 6 show the rear of the tool when the blade 46 and blade supporting member 47 are in the suspended and in the fiber contacting positions, respectively. As may be appreciated by a comparison of these two figures, the counterclockwise rotation of the thumb latch 48 as viewed in FIG. 1 causes a corresponding clockwise rotation of the cam 60 as viewed in FIGS. 5 and 6. One tip 60A of the cam 60 contacts an outwardly extending contact member 74 associated with a linkage member 62. The linkage member 62 includes an annular sleeve 62A at its other end through which the dashpot arm 54 passes. The upper surface of the sleeve 62A supports the blade supporting member 47 in its suspended position. It may be fully appreciated that the clockwise rotation of the cam 60 causes its edge 60A to depress the contact member 74 of the linkage member 62. The unsupported blade supporting member 47 is thereby permitted to fall, as shown in FIG. 6, at a velocity which is limited by the dashpot 56. The velocity may be controlled by adjusting the dashpot by means of a manually rotatable thumb wheel 58 in a manner known in the art.

In the embodiment illustrated the cam 60 is additionally provided with a hook-shaped extension 64 which engages an outwardly extending pin 66 on the sleeve 62A when the blade is in its fiber contacting position. The engagement of the pin 66 by the cam 60 provides a locked position which may be utilized during transportation and storage of the tool in order to protect the blade.

When the thumb latch 48 is reset to its initial position, the counterclockwise rotation of the cam 60, as viewed in FIGS. 5 and 6, removes the cam surface 60A from the contact member 74. A resilient member such as a leaf spring 68 is coupled to the blade supporting member 47 in a manner which exerts an upwardly directed force so that the blade returns to its initial suspended position.

Although a scoring action by the blade of the present tool has been found unnecessary for most fiber waveguides, there may be instances where service personnel would find such a capability helpful. The presently described embodiment may be easily modified to provide scoring when necessary. Accordingly, a small clearance, such as 0.005 inch, may be provided between the rear portion 47A of the blade supporting member and the backplate 11 so that a slight lateral movement thereof through the backplate slot is permitted. A resilient member such as a small weak leaf spring may be located in the newly defined gap to prevent lateral blade movement unless the rear blade support member portion 47A is pressed forward.

Figure 7:
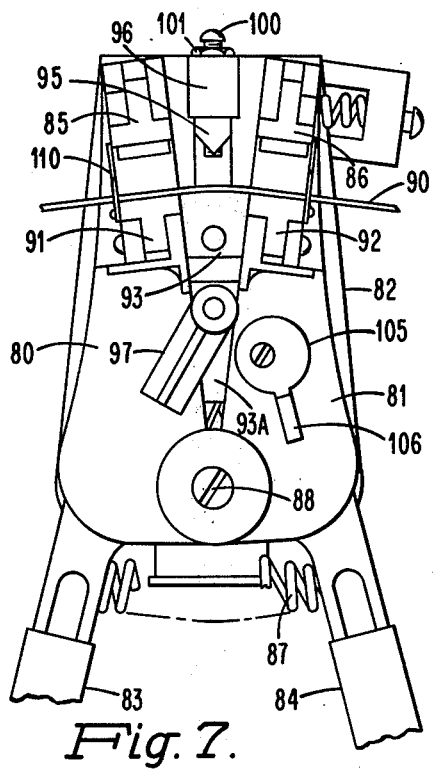
FIG. 7 illustrates a modification of the hand-held fiber end preparation tool in accordance with the present invention.
Figure 8:
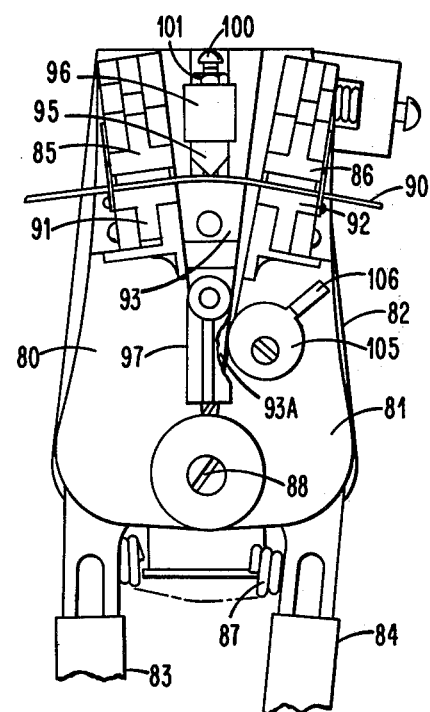
FIG. 8 illustrates the tool of FIG. 7 in its fiber tensioning position with the blades alighting on the fiber waveguide.

FIGS. 7 and 8 illustrate a modification of the handheld fiber end preparation tool shown in FIGS. 1 through 6. The tool is basically similar, employing two jaw members 80 and 81 mounted for pivotal movement with respect to each other on a backplate 82. The squeezing of handle members 83 and 84 causes fiber clamping members 85 and 86 which are slidably mounted on jaw members 80 and 81, respectively, to clamp an optical fiber waveguide 90 against fiber supporting members 91 and 92.

As in the previously described embodiment further squeezing of the handle members 83 and 84 causes jaw member 81 to rotate about the pivot point 88 and place the optical fiber waveguide 90 under tensile stress while bending it across a fiber supporting surface provided by an anvil 93. A cutting blade 95 is fixed in a supporting member 96 which is mounted for vertical sliding motion on the backplate 82 as in the previously described embodiment. The supporting member 96 is released by actuation of a thumb latch 97 causing the cutting blade to descend and cleave the fiber optic waveguide 90, thereby providing a proper break as explained hereinabove.

Figure 9:
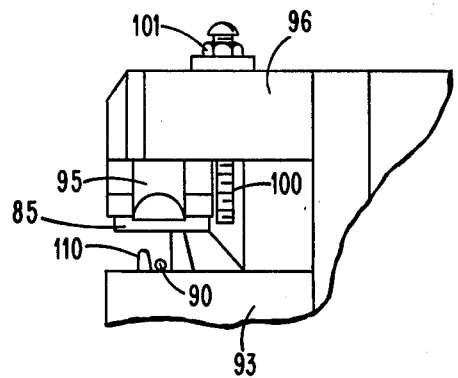
FIG. 9 is a fragmentary side view of the tool of FIG. 7.

As illustrated in FIGS. 7 and 8, but shown more clearly in the fragmentary side view of FIG. 9, in the embodiment presently under discussion a stop member 100 is mounted in the blade supporting member 96 so as to limit the descent of the cutting blade 95. The principal purpose of the stop is to insure that the cutting blade descends onto the periphery of the optical fiber waveguide so as to produce a microcrack therein but does not strike the surface of the anvil 93. Thus the surface of the anvil is protected from nicks and scratches which might be caused by the cutting blade, and in addition the cutting blade is protected. As illustrated most clearly in FIG. 9 the stop 100 includes a screw which is threaded into the blade supporting member 96 and retained in place by a lock nut 101 permitting adjustment of the minimum distance between the cutting blade and the anvil surface.

The hand-held fiber end preparation tool as illustrated in FIGS. 7 and 8 also includes a circular locking cam 105 having an extension 106 permitting actuation by thumb. The cam 105 is mounted eccentrically on jaw member 81 to permit pivotal movement with respect thereto. As illustrated in FIG. 7 with the jaw members 80 and 81 in their comparatively unseparated position the cam is in a rotational position so as not to interfere with the separating or closing together of the jaw members. While the jaw members are separated by squeezing of the handle members 83 and 84, the blade is lowered to cleave the waveguide and then the blade is raised. The cam 105 is then rotated to the position shown in FIG. 8. In this position the cam bears against the lower portion 93A of the anvil 93 which protrudes forward of the jaw members 80 and 81. Jaw member 81 is thus locked in the separated position as shown in FIG. 8 even after release of the handle members 83 and 84.

After the fiber waveguide has been cleaved and the cutting blade returned to its initial position, the handle members 83 and 84 are released while the cam 105 is holding the jaw members in the separated position. Compression spring 87 urges the handle members apart, and the linkage coupling the handle members to the clamping members 85 and 86 causes the clamping members to move upward releasing the two portions of the cleaved fiber waveguide 90. Unclamping of the waveguide portion prior to movement of the jaw members toward each other insures that the newly severed fiber ends will not be pushed against each other possibly breaking the waveguide or otherwise disrupting the properly prepared end surface. After the fiber waveguide portions have been removed from the tool, the handle members 83 and 84 may be squeezed together sufficiently to permit the cam 105 to be rotated to its original position as shown in FIG. 7 and the handle members released, thereby readying the tool for the next cleaving operation.

Figure 10:
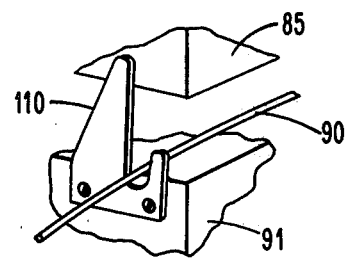
FIG. 10 is a fragmentary side view in perspective illustrating a detail of the tool of FIG. 7.

The fragmentary view of FIG. 10 illustrates a detail of the tool shown in FIGS. 7, 8, and 9. A fiber locating or positioning plate 110 is mounted on the side of the fiber support member 91. The plate has two upstanding portions forming an intermediate valley which receives and properly positions the fiber waveguide 90. A similar plate is mounted on the side of the other fiber support member 92. The two plates insure that the waveguide 90 is properly located on the fiber supporting members 91 and 92 and properly positioned on the anvil 93 with respect to the cutting blade 95.

Figure 11:
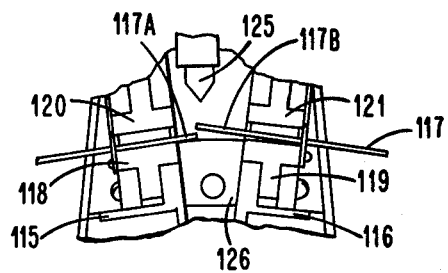
FIG. 11 is a fragmentary view illustrating another modification of the tool in accordance with the present invention.

FIG. 11 is a fragmentary view illustrating another modification of the hand-held fiber end preparation tool in accordance with the present invention. FIG. 11 shows the tool with the jaw members 115 and 116 in the separated position subsequent to cleaving of the fiber waveguide 117 by the cutting blade 125. The two portions 117A and 117B of the cleaved waveguide are shown clamped against the fiber supported members 118 and 119 by clamping members 120 and 121, respectively. In this embodiment the cutting blade 125 is positioned above the anvil 126 at a point which is nearer to one clamping member 120 than to the other 121. That is, the arrangement is asymmetric and the two portions 117A and 117B of the cleaved waveguide are of different lengths. As illustrated in FIG. 11 the two portions extend tangentially from the curved surfaces of fiber supporting members 118 and 119 to which they are clamped, and by virtue of the difference in their lengths their ends are staggered. Thus, the newly prepared ends do not interfere with each other even if the jaw members return to their comparatively unseparated position prior to release of the waveguide portions by the clamping members.

Figure 12:
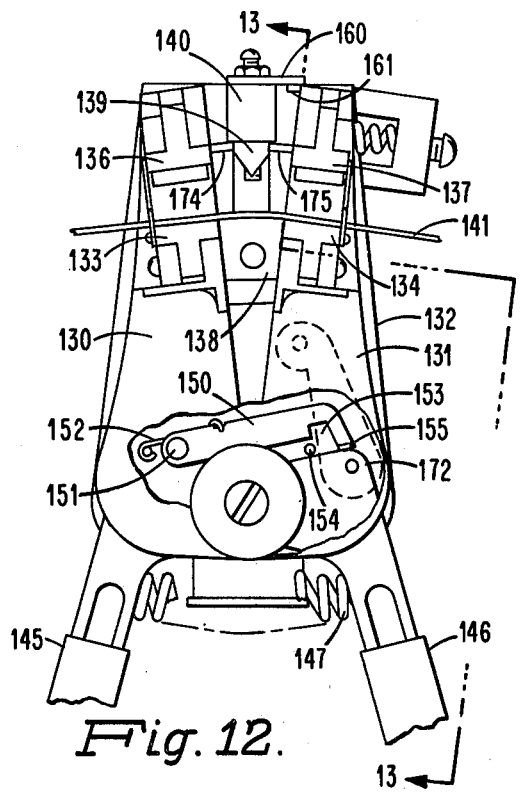
FIG. 12 is a view with portions broken away illustrating a further modification of a tool in accordance with the present invention.
Figure 13:
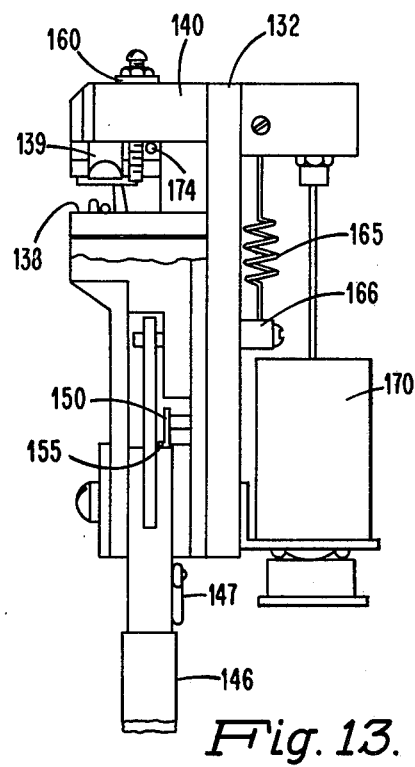
FIG. 13 is a side view of the tool as shown in FIG. 12 partially in section taken along line 13—13 of FIG. 12.
Figure 14:
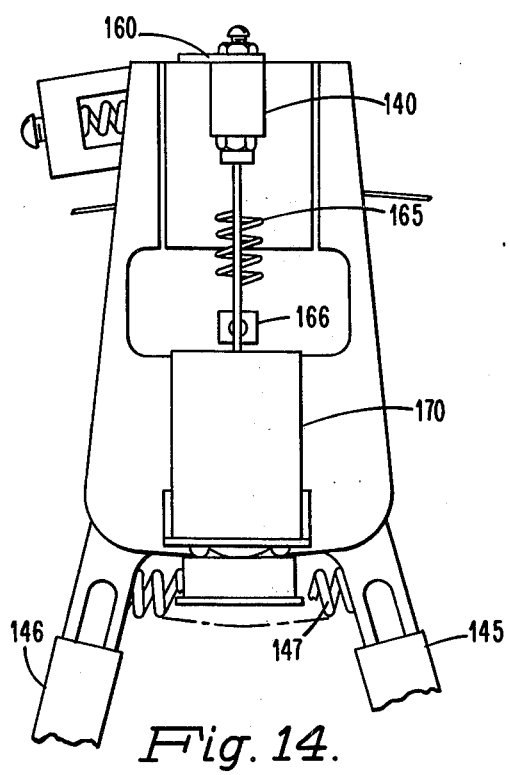
FIG. 14 is a rear view of the tool as shown in FIG. 12.

FIGS. 12, 13, and 14 are front, partial side, and rear views, respectively, of another modification of the hand-held fiber end preparation tool in accordance with the invention. The tool operates generally in the manner of previously described embodiments to cleave the waveguide by placing it under tensile stress across the curved surface of the anvil and initiating a microcrack therein by lowering the cutting blade into contact with its periphery. In addition, the embodiment under discussion includes additional features for automatically lowering the cutting blade when the jaw members are separated to a predetermined position, for latching the jaw members in the separated position, and for automatically restoring the cutting blade to its initial position after cleaving.

A pair of jaw members 130 and 131 are mounted for relative pivotal movement on a backplate 132. Jaw member 130 which is fixed to the backplate 132 has a fiber supporting member 133 mounted thereon. A similar fiber supporting member 134 is mounted on the movable jaw member 131. Fiber clamping members 136 and 137 are movably mounted on jaw members 130 and 131, respectively. An anvil 138 is mounted on the backplate 132 between the two fiber supporting members 133 and 134, and a cutting blade 139 in a supporting block 140 is mounted for vertical movement above the surface of the anvil 138. An optical fiber waveguide 141 is supported on the surfaces of the fiber supporting members and may be properly positioned as by plates such as shown in FIG. 10. The handle members 145 and 146 are squeezed together in opposition to the compression spring 147 causing the fiber clamping members 136 and 137 to clamp the waveguide 141 against the surfaces of the fiber supporting members 133 and 134. Further squeezing of the handle members 145 and 146 causes the jaw member 131 to pivot with respect to the jaw member 130 placing the waveguide 141 under tensile stress as explained hereinabove.

The tool of FIGS. 12, 13, and 14 employs a latching member 150 which is mounted by means of a pivot 151 on the backplate 132. The latch member is biased in a clockwise direction as shown in FIG. 12 by a spring 152. When the handle members 145 and 146 are squeezed together moving the jaw members 130 and 131 apart by a predetermined distance, a notch 153 in the latch member 150 is engaged by a pin 154 fixed to the jaw member 131. The amount of relative movement of the jaw member is thus limited to a predetermined amount selected to provide the desired tensile stress in the fiber waveguide 141.

The blade supporting block 140 has an arm 160 which extends over a protrusion or shoulder 161 at the upper portion of the jaw member 131 when the jaw members are in the unseparated position as shown in FIG. 12. The length of the arm 160 is set so as to become disengaged from the protrusion 161 on the jaw member 131 as the pin 154 engages the notch 153 of the latch member 150 or just before the pin 154 engages the notch 153. As the protrusion 161 clears the arm 160, the supporting block 140 containing the blade 139 is released from the initial position. The blade descends to contact the periphery of the waveguide 141 cleaving it in accordance with the previously described explanation.

Although an arrangement in which the blade mounting element 140 descends under the influence of gravity as in the previously described embodiments may be employed, the present embodiment as shown in FIGS. 13 and 14 employs a tension spring 165 to lower the cutting blade. the spring 165 is fixed to the rearwardly extending portion of the blade supporting block 140 and to an extension 166 of the backplate 132. The rate of movement of the cutting blade is controlled by an air dashpot 170 as explained hereinabove. Lowering of the cutting blade by a tension spring rather than by gravity permits operation of the tool in any attitude.

After the cleaving of the waveguide 141, the handle members 145 and 146 are released. Since the pin 154 engages the notch 153, the latch member 150 prevents the jaw members 130 and 131 from moving toward each other. Thus, the first movement of the handle members 145 and 146 raises the clamping members 136 and 137 releasing the two portions of the cleaved fiber waveguide 141. Since the two portions of the waveguide are released while the jaws are separated, their ends do not interfere with each other. As the fiber clamping members 136 and 137 are returning to their initial positions, either one or both of pins 174 and 175 which are mounted on the clamping members 136 and 137, respectively, engage the bottom surface of the blade supporting block 140. The blade supporting block 140 and blade 139 are thus raised along with the clamping members restoring them to the initial position. The two portions of the cleaved waveguide 141 may then be removed from the tool.

After the handle member 146 has moved a predetermined amount, the surface of its upper portion 172 strikes a tab 155 on the latch member 150. Further movement of the handle member rotates the latch members releasing the latch member from the pin 154. Then, tension springs, as discussed previously, rotate the jaw member 131 and restore it to its initial position. Return of the jaw members to the comparatively unseparated position thus takes place after the clamping members have released the fiber waveguide and the cutting blade has been restored to its initial position leaving the tool in readiness for the next cleaving operation.

Figure 15:
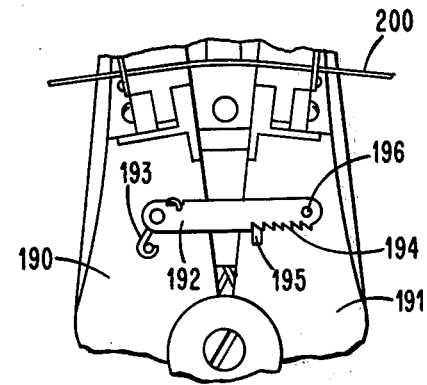
FIG. 15 is a fragmentary view illustrating a still further modification of the tool in accordance with the present invention.

FIG. 15 illustrates a fragment of a still further modification of the hand-held tool of the invention. The feature illustrated may be employed with any of the embodiments discussed hereinabove in place of the disclosed means for holding the jaw members separated or together with the latching arrangement shown in FIGS. 12 and 13. In the embodiment illustrated in the fragmentary view of FIG. 15, jaw members 190 and 191 are held in a separated position by means of a ratchet 192. The ratchet 192 is mounted for pivotal movement on the jaw member 190 and is biased in a clockwise direction, as shown, by a spring 193. The ratchet teeth 194 bear against a stop member 195 mounted on the movable jaw member 191. The ratchet teeth 194 engage the stop member 195 permitting opening of the jaw members but preventing closing of the jaw members. After the tool has been operated to cleave the fiber waveguide 200 as explained hereinabove, the handle members are released, the waveguide is unclamped and the cutting blade is returned to its initial position. The ratchet 192 may then be released as by pushing upward on a release pin 196 protruding from the ratchet 192 thereby disengaging the ratchet teeth 194 from the stop 195 and causing the jaw members to be restored to the comparatively unseparated position.

While there has been shown and described what are considered preferred embodiments of the present invention, it will be obvious to those skilled in the art that various changes and modifications may be made therein without departing from the invention as defined by the appended claims.

What is claimed is:

1. A hand-held tool for the preparation of optical fiber waveguide ends comprising
   a pair of jaw members coupled for separating rotational movement about a pivot axis;
   means for biasing the jaw members in a comparatively unseparated position;
   first and second fiber supporting surfaces respectively located on a different one of the jaw members for receiving and supporting an optical fiber waveguide generally circumferentially about the pivot axis;
   a third fiber supporting surface between the first and second fiber supporting surfaces and generally aligned therewith;
   a pair of spaced-apart handle members adapted for movement by a squeezing human hand;
   fiber clamping means responsive to movement of the handle members for exerting a waveguide securing force against the first and second fiber supporting surfaces and for exerting a jaw member separating force in response to further movement of the handle members thereby inducing a tensile stress along the waveguide;
   a descendable cutting blade releasable from a position above the third fiber supporting surface for contacting the portion of the fiber waveguide thereon to produce a microcrack in the waveguide periphery whereby the induced tensile stress in the waveguide coupled with the circumferential support thereof causes a diametric propagation of the crack across the waveguide to produce an appropriately prepared fiber end; and
   stop means for limiting movement of said cutting blade to prevent the cutting blade from contacting the third fiber supporting surface.

2. A hand-held tool in accordance with claim 1 wherein
   the stop means is adjustable for permitting adjustment of the minimum distance between the cutting blade and the third fiber supporting surface.

3. A hand-held tool for the preparation of optical fiber waveguide ends comprising
   a pair of jaw members coupled for separating rotational movement about a pivot axis;
   means for biasing the jaw members in a comparatively unseparated position;
   first and second fiber supporting surfaces respectively located on a different one of the jaw members for said coupling means is responsive to movement of said handle members apart upon release of said handle members to move the fiber clamping members away from the corresponding fiber supporting surfaces thereby releasing the fiber waveguide positioned therebetween; and said jaw restraining means includes
- a latch member pivotally mounted with respect to one of said jaw members;
- a latch engaging member fixedly mounted on the other of said jaw members,
- said latch member having a notch for engaging the latch engaging member when the jaw members are separated by a predetermined amount,
- biasing means for urging the latch member against the latch engaging member whereby when the jaw members are separated said predetermined amount in response to movement of the handle members the notch in the latch member engages the latch engaging member, and
- latch release means operable to disengage the latch member from the latch engaging member and permit the jaw members to return to the comparatively unseparated position in response to movement of the handle members apart to a predetermined position upon release of said handle members, whereby upon release of the handle members the fiber clamping members move away from the fiber supporting surfaces releasing the fiber waveguide and subsequently the jaw members return to the comparatively unseparated position.

10. A hand-held tool in accordance with claim 9 wherein said latch release means includes
- an extension on said latch member extending into the path of movement of a portion of one of the handle members upon movement apart of said handle members subsequent to said latch member engaging said latch engaging member;
- said extension being spaced from said portion of the handle member when the latch member engages the latch engaging member and prior to movement apart of the handle members.

11. A hand-held tool in accordance with claim 6 including
- a blade mounting element supporting said blade in fixed relationship thereto and slidably mounted on said support for movement from an initial position with the blade in position above the third fiber supporting surface to a lowered position at which the blade contacts the fiber waveguide; and
- blade raising means coupled to a fiber clamping member and operable to raise the blade mounting element from the lowered position to the initial position when the fiber clamping members move away from the fiber supporting surfaces.

12. A hand-held tool in accordance with claim 10 including
- a blade mounting element supporting said blade in fixed relationship thereto and slidably mounted on said support for movement from an initial position with the blade in position above the third fiber supporting surface to a lowered position at which the blade contacts the fiber waveguide; and
- blade raising means coupled to a fiber clamping member and operable to raise the blade mounting element from the lowered position to the initial position when the fiber clamping members move away from the fiber supporting surfaces.

13. A hand-held tool for the preparation of optical fiber waveguide ends comprising
- a support;
- a pair of jaw members coupled for separating rotational movement about a pivot axis on said support;
- means for biasing the jaw members in a comparatively unseparated position;
- first and second fiber supporting surfaces respectively located on a different one of the jaw members for receiving and supporting an optical fiber waveguide generally circumferentially about the pivot axis;
- first and second fiber clamping members each movably mounted on a different one of the jaw members for clamping a fiber waveguide between the fiber clamping members and the corresponding fiber supporting surfaces;
- a third fiber supporting surface fixed with respect to the support between the first and second fiber supporting surfaces and generally aligned therewith;
- a pair of spaced-apart handle members pivotally mounted on said support and adapted for movement by a squeezing human hand;
- coupling means coupling the handle members to the fiber clamping members and to the jaw members and being responsive to movement of the handle members to move the fiber clamping members toward the corresponding fiber supporting surfaces thereby exerting a waveguide securing force on the fiber waveguide positioned therebetween and being responsive to further movement of the handle members to separate the jaw members thereby inducing a tensile stress along the fiber waveguide; and
- a blade mounting element supporting a cutting blade and slidably mounted on said support for movement from an initial position with the blade in position above the third fiber supporting surface to a lowered position at which the blade contacts the portion of the fiber waveguide on the third fiber supporting surface to produce a microcrack in the waveguide periphery whereby the induced tensile stress in the waveguide coupled with the circumferential support thereof causes a diametric propagation of the crack across the waveguide to produce an appropriately prepared fiber end;
- blade mounting element release means for releasing said blade mounting element from said initial position in response to separation of the jaw members by a predetermined amount thereby permitting movement of the blade mounting element from the initial position to the lowered position.

14. A hand-held tool in accordance with claim 13 wherein
- a portion of one of the jaw members engages a portion of the blade mounting element preventing movement of the blade mounting element from the initial position when the jaw members are in the comparatively unseparated position;
- said portion of one of the jaw members and said portion of the blade mounting element becoming disengaged releasing the blade mounting element and permitting movement thereof from the initial position to the lowered position when the jaw members have been separated by said predetermined amount.

15. A hand-held tool in accordance with claim 14 including
- handle biasing means for urging the handle members apart;
- jaw restraining means for maintaining the separated jaw members separated;

wherein
- said coupling means is responsive to movement of said handle members apart upon release of said handle members to move the fiber clamping members away from the corresponding fiber supporting surfaces thereby releasing the fiber waveguide positioned therebetween while the jaw restraining means maintains the jaw members separated;

and further including
- blade raising means associated with one of the fiber clamping members for raising the blade mounting element from the lowered position to the initial position in response to moving of the fiber clamping member away from the corresponding fiber supporting surface.

16. A hand-held tool in accordance with claim 15 including
- release means for releasing the jaw restraining means subsequent to movement of the handle members apart a predetermined distance upon release of said handle members and consequent movement of the fiber clamping members away from the fiber supporting surfaces and raising of the blade mounting element to the initial position thereby permitting the jaw members to return to the comparatively unseparated position.

* * * * *